UNITED STATES PATENT OFFICE.

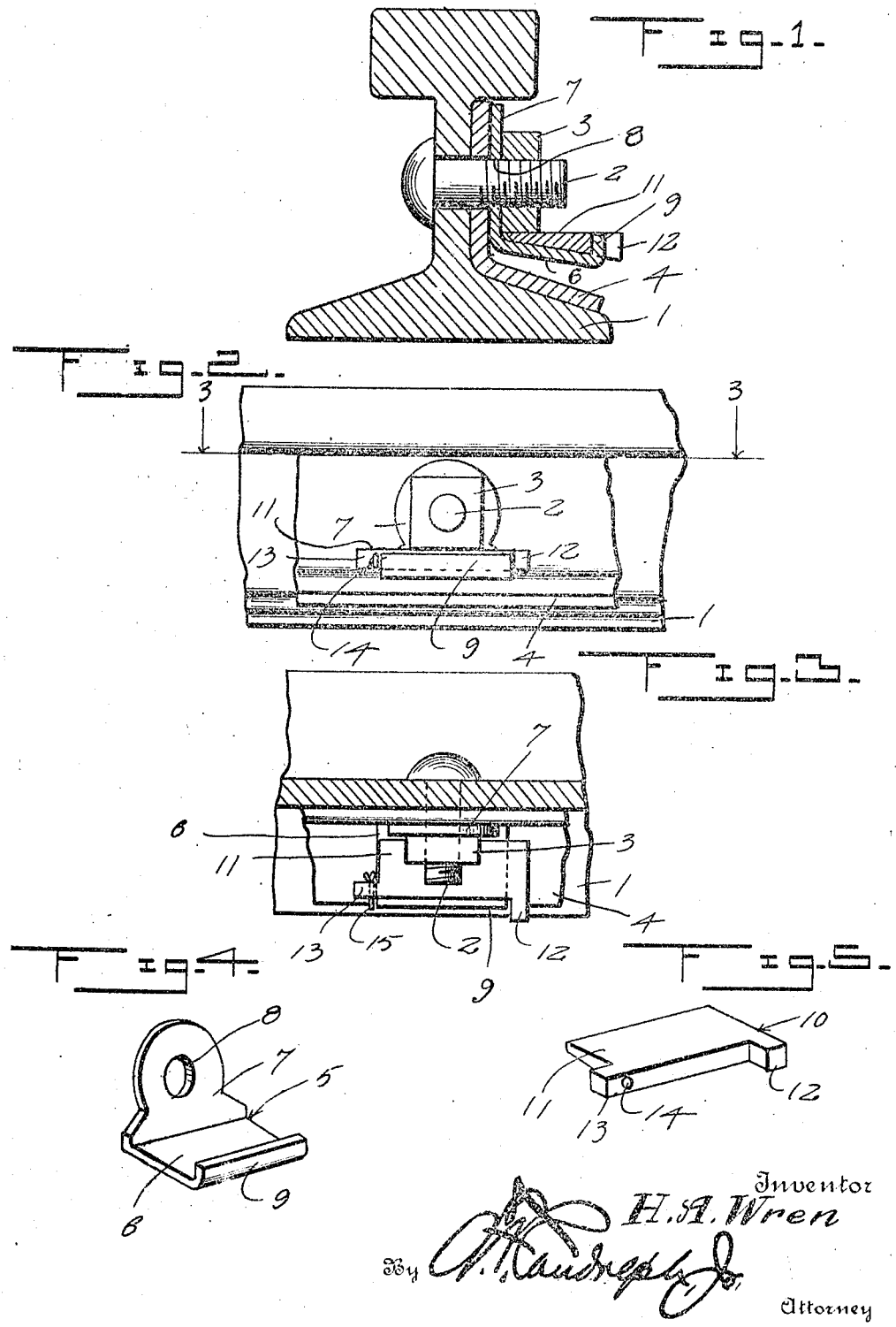

HARVEY A. WREN, OF STRAWBERRY, SOUTH CAROLINA.

NUT-LOCK.

1,292,557.  Specification of Letters Patent.  Patented Jan. 28, 1919.

Application filed May 15, 1918. Serial No. 234,667.

*To all whom it may concern:*

Be it known that I, HARVEY A. WREN, a citizen of the United States, residing at Strawberry, in the county of Berkeley and State of South Carolina, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks, and has for one of its objects the provision of a device of this character, whereby the nut employed for securing the bolt of a rail joint can be locked against rotation in either direction after the nut has been turned home, thereby obviating the loosening of the nut which causes separation of the rail joints.

Another object of this invention is the provision of a nut chair carried by the bolt having means adapted to hold the nut against rotation on the bolt.

A further object of this invention is the provision of means whereby the device may be used in connection with nuts of different sizes.

A further object of this invention is the provision of a nut lock of the above stated character, which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference will be had to the following description and accompanying drawings, in which:

Figure 1 is a transverse sectional view of a nut lock constructed in accordance with my invention, Fig. 2 is a front elevation of the same, Fig. 3 is a longitudinal sectional view, taken on the line 3—3 of Fig. 2, Fig. 4 is a perspective view of the chair, and Fig. 5 is a perspective view of the locking means carried by the chair.

Referring in detail to the drawing, the numeral 1 indicates a railroad rail having a bolt 2 on which is threaded a nut 3 for retaining the fish plate 4 upon the rail 1. The foregoing description relates to a well known construction of rail joint to which my invention is adapted to be applied, however I do not care to be limited to the use of my invention upon rail joints as the same can be readily used in connection with other devices employing bolts and nuts for connecting them together.

A chair 5 consists of a plate 6, having formed upon one edge thereof a vertically disposed ear 7 provided with an opening 8 to receive the bolt 2 before the nut 3 is applied thereon. The other edge of the plate 6 has formed thereon a retaining flange 9. The ear 7 is applied to the bolt 2 and the nut 3 is then threaded onto the bolt, so that the chair 5 is supported in spaced relation to a fish plate 4, as clearly illustrated in Fig. 1. A locking member 10 consisting of a wedge-shaped portion 11 is driven onto the plate 6 between the same and the nut 3, and has formed theron a lateral projection 12, which limits the movement of the locking member 10 in one direction upon the plate 6 by engaging one end of the flange 9, and which flange prevents the wedge-shaped portion 11 from moving away from the nut 3. An extension 13 is formed upon the outer end of the locking member 10 and projects beyond the other end of the flange 9 and the plate 6, and is provided with an opening 14 to receive a cotter pin, or like fastener 15, that coöperates with the projection 12 in preventing the locking member 10 from moving laterally with relation to the chair 5.

While I have shown and described the preferred embodiment of my invention, it will be understood that minor changes in construction, combination and arrangement of parts may be made without departing from the spirit and scope of the invention as claimed.

Having thus described my invention, what I claim is:

1. A lock nut comprising a plate, an apertured ear formed upon one edge of said plate and disposed angularly thereto to receive a bolt, a flange formed upon the other edge of said plate and extending in the same direction with the ear and a locking member carried by said plate adapted to engage a nut to hold the same against rotation upon the bolt.

2. A lock nut comprising a chair adapted to be attached to a bolt, a wedge-shaped member carried by said chair and in engagement with the nut, a lateral projection upon one end of said wedge-shaped member for limiting the movement thereof in one direction, and an apertured extension carried by the other end of said wedge-shaped member, and a fastener extending through the opening to limit the movement of the wedge-shaped member in the other direction.

In testimony whereof I affix my signature in presence of two witnesses.

HARVEY A. WREN.

Witnesses:
H. M. ANDERSON,
G. W. DANGERFIELD.